United States Patent [19]

Hermann, Jr.

[11] 4,129,419

[45] Dec. 12, 1978

[54] DISPOSABLE LABORATORY DEVICE FOR TRANSFER OF FLUIDS TO A CENTRIFUGAL ANALYZER HEAD

[75] Inventor: William J. Hermann, Jr., Houston, Tex.

[73] Assignee: Jocelyn Dickson, Potomac, Md. ; a part interest

[21] Appl. No.: 896,548

[22] Filed: Apr. 14, 1978

Related U.S. Application Data

[63] Continuation-in-part of Ser. No. 734,950, Oct. 22, 1976, Pat. No. 4,086,060.

[51] Int. Cl.$^2$ .............................................. G01N 1/14

[52] U.S. Cl. ...................................... 422/64; 222/394; 233/1 R; 233/26; 422/100

[58] Field of Search ............... 23/259, 253 R; 233/26, 233/1 R; 222/394

[56] References Cited

U.S. PATENT DOCUMENTS

| | | | |
|---|---|---|---|
| 1,331,207 | 2/1920 | Mouneyrat | 23/253 R |
| 1,548,186 | 8/1925 | Claude | 222/394 X |
| 1,606,400 | 11/1926 | Cheney | 23/259 |
| 2,679,140 | 5/1954 | Burchett | 222/394 |
| 3,151,073 | 9/1964 | Anthon | 23/259 X |
| 3,193,359 | 7/1965 | Baruch et al. | 23/259 |
| 3,522,011 | 7/1970 | Sanderson | 23/259 |
| 3,849,072 | 11/1974 | Ayres | 23/259 |
| 3,953,172 | 4/1976 | Shapiro et al. | 233/26 X |

*Primary Examiner*—R.E. Serwin
*Attorney, Agent, or Firm*—David H. Semmes; Warren E. Olsen

[57] ABSTRACT

A disposable laboratory device for transfer of fluids, such as biological fluids or reagents, to specific wells of a centrifugal analyzer head. The device itself is a disposable, multi-compartmental system within an arcuately extending enclosure. In the preferred embodiment, the enclosure extends in a circular arc of approximately 120°, whereby one-third of the wells arranged around a circular centrifugal analyzer head can be filled with a single manipulation. Each of the compartments is preferably trapezoidal in plan view, with a bottom surface that includes an outlet means for each compartment proximate radially innermost portions of the enclosure. Equal volumes of pressurized gas distributed to each of the compartments exactly dispense equal volumes from each of the compartments into wells in a circular analyzer head which is held in a registration position. In combination with the disposable transfer device itself the present invention includes a rack specifically constructed to facilitate registration of the analyzer head with respect to the disposable enclosure, and pivoting of the enclosure into its horizontal operating orientation.

16 Claims, 6 Drawing Figures

DISPOSABLE LABORATORY DEVICE FOR TRANSFER OF FLUIDS TO A CENTRIFUGAL ANALYZER HEAD

CROSS-REFERENCE TO RELATED APPLICATONS

This application is a continuation-in-part of my copending application entitled DISPOSABLE MANIPULATIVE LABORATORY DEVICE FOR TRANSFERRING BIOLOGICAL FLUIDS, filed Oct. 22, 1976 as Ser. No. 734,950 and now U.S. Pat. No. 4,086,060.

BACKGROUND OF THE INVENTION

This invention relates to a disposable laboratory device, and one which is particularly adapted to transfer a plurality of biological fluids from primary containers to associated wells in a centrifugal analyzer head. In the preferred embodiment, one-third of the wells radially arranged around a centrifugal analyzer head may be filled in one decanting operation, with subsequent indexing of the head allowing for a second and third decanting into the remaining two-thirds of the available wells. The present invention has particular utility for laboratory dispensing of serum or plasma subsequent to an earlier centrifugation step and prior to analysis of the serum through combination with reagents in a centrifugal analyzer head.

The present invention teaches certain specific improvements upon my above-noted earlier invention entitled DISPOSABLE MANIPULATIVE LABORATORY DEVICE FOR TRANSFERRING BIOLOGICAL FLUIDS, which is incorporated herein by reference.

The present invention is a specific embodiment for use in the loading of centrifugal analyzer heads, for example, of the type shown in the U.S. Pat. No. 3,798,459. The present invention also includes an embodiment for simultaneously loading of, for example, both blood serum and a reagent which are to be subsequently mixed by centrifugal analysis. The present invention also teaches a particular form of rack construction which allows gang filling of one-third of the available wells in a centrifugal analyzer head, with a single operation.

SUMMARY OF THE INVENTION

The basic operating principles of this invention are equivalent to the teachings in my above-noted parent application, incorporated herein by reference. The present invention illustrates a specific embodiment of disposable laboratory fluid transfer device for gang loading of a portion of the wells in a centrifugal analyzer head. The present invention also includes, in combination, a specifically structured rack which is designed to accommodate a disposable enclosure module that includes compartments equal to one-third of the number of the wells which are circumferentially provided for fluid sample loading, in conventional centrifugal analyzer heads. Representative centrifugal analyzer heads for which the present invention allows particularly efficient loading are those known marketed under the trademark ROTOCHEM, which are available, for example, with 15 or 36 radially arranged loading wells. Further examples of centrifugal analyzer heads appropriate for use with versions of the present invention are illustrated by the U.S. Pat. Nos. 3,795,451 and 3,555,284.

The present invention is particularly useful for laboratory blood analysis work, wherein it is necessary to load each well in a centrifugal analyzer head with an aliquot (5 to 500 microliters), of filtered blood serum. The present invention has a particular utility in laboratory blood analysis since a plurality of standard blood collection tubes can be quickly and accurately positioned for a filtering and gang unloading of serum into their respective wells.

The enclosure of the present invention defines at least one radially disposed compartment therein which is adapted to maintain a fluid separate from any adjacent compartments. The enclosure is defined by a first radially outermost surface which is adapted to receive the open end of a radially disposed primary container, and thereby establish a flow communication between the primary container and its associated compartment within the enclosure. The enclosure further is characterized by a second surface which includes an outlet means operable for a selective outlet flow communication from each of the compartments to associated wells in a centrifugal analyzer head when the second surface is positioned substantially horizontal, and above a centrifugal analyzer that is itself maintained in a registration position.

A laboratory technician simply attaches a single means, which delivers a selectively controlled volume of pressurized gas to each compartment. A selectively controlled volume of gas is transmitted in parallel to each of the compartments within the enclosure. The gas volume acts as the driving force to discharge exactly controlled, and equal, volumes of fluid from each compartment. The fluid output from the enclosures can be accomplished only when the device is both positioned with the second surface substantially horizontal, to allow a gravitational flow from the primary container into a compartment, and the pressurized gas is applied. The outlet flow communication is valved by a bouyant ball sitting within a conical extension from the second surface, so that if a given compartment is emptied of its fluid, the ball will occlude the outlet of that compartment and prevent loss of pressure from the enclosure.

The present invention is also significantly characterized by combination of the enclosure and a pivoting rack assembly which is a semicircular, annular member having pivot elements extending at diametrically opposite ends thereof. Extending radially outward from the annular member is a web portion which occupies approximately 120° of the semicircular, or 180° extent of the semicircular annular member. The web portion is specifically adapted to support a plurality of the primary containers in a proper radial orientation, so that the enclosure can be mounted upon the open, radially inward, ends of each of the primary containers, in a simple manipulation. The pivotable element of the rack is itself simply supported upon a vertical support member which allows the pivoting member to be moved from a rest position and into a substantially horizontal orientation position, ready for the dispensing function. This embodiment of the present invention includes indexing means to locate the centrifugal analyzer head in the necessary registration position, whereby a single manipulation of the pivotable member on the support allows one-third of the wells to be filled, at one time.

The primary object of the present invention is to provide an enclosure which can be quickly mounted upon a number of primary containers and ensure that the fluids within each container are separately and accurately dispensed into associated wells in a centrifugal analyzer head. The enclosure is able to easily also accommodate any necessary filter media, including those of the molecular sieve type.

A related feature of the present invention is to combine a particularly configured rack to support the combination of the radially disposed primary containers with an enclosure mounted upon their inner ends, so that a single manipulation of the pivotable member of the rack will bring the device into a ready position for the pressurization and dispensing function.

As will become more apparent from the following detailed description of the invention, the invention comprises a particular disposable laboratory transfer device which can be effectively used in combination with a centrifugal analyzer head, whereby a gang dispensing into aproximately one-third of the analyzer head wells can be quickly and efficiently accomplished. Further objects, advantages, and features of the present invention will become more apparent by reference to the following detailed description, wherein reference is made to the accompanying drawings.

DESCRIPTION OF THE PREFERRED EMBODIMENT

Figure 1:
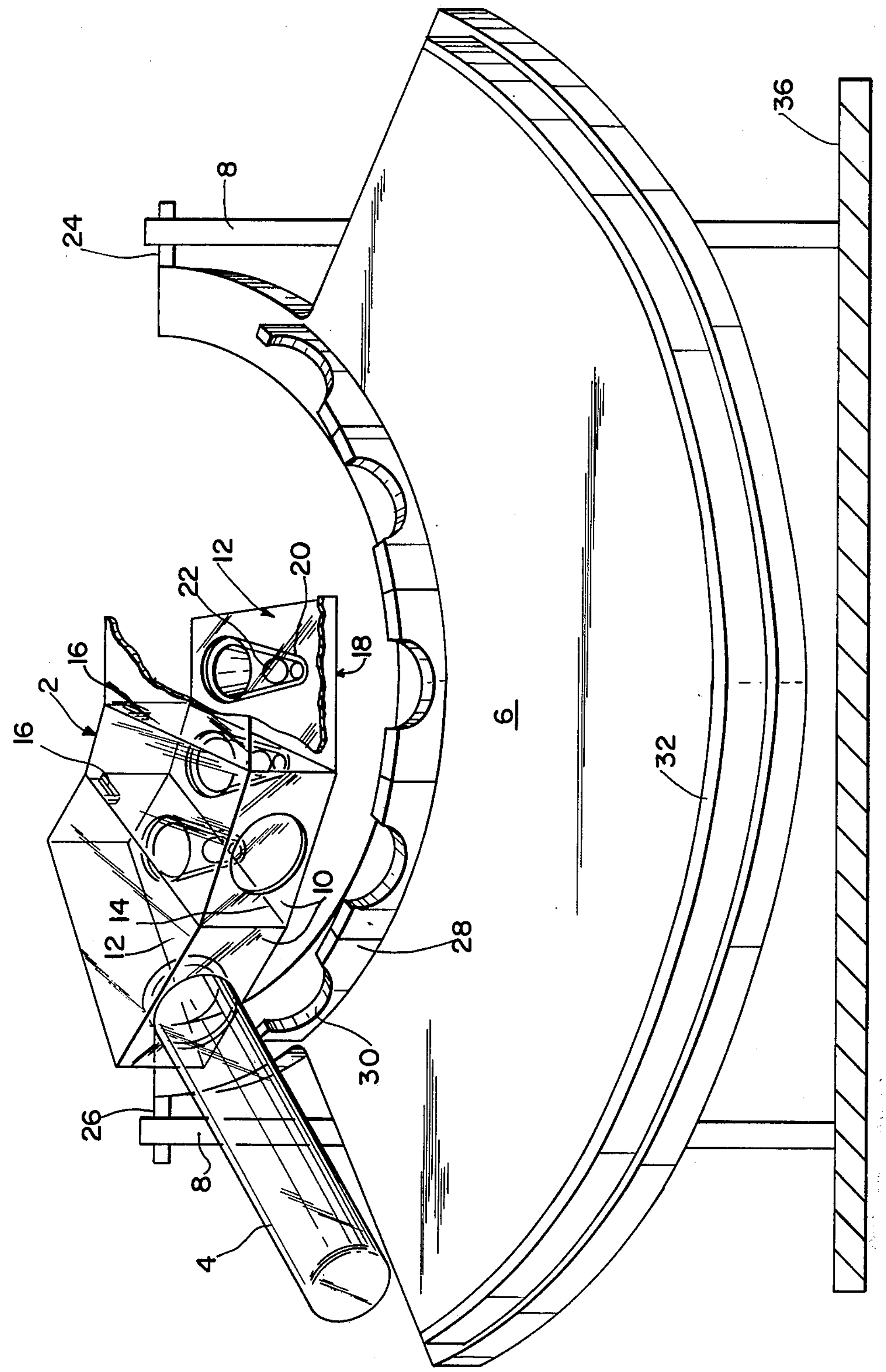
FIG. 1 illustrates, in an elevational explosion view, a preferred embodiment of enclosure and supporting pivoting rack assembly.

FIG. 1 illustrates the basic operating elements for a preferred embodiment of the invention. FIG. 1 is an elevation view wherein the inventive enclosure according to the present invention is shown in exploded and partial section view, above its rest position upon a rack, part of a combination according to the present invention.

In FIG. 1, the enclosure, 2, consists of an arcuately extending series of compartments which are each aligned with radii of curvature of the enclosure. The enclosure has a first radially outermost surface, 10, which is adapted to receive the open ends of a plurality of radially disposed primary containers, one primary container, 4, being shown in its inserted position. The enclosure, with one or more primary containers, together constitute replaceable components that are easily nested on a permanent pivoting rack member, 6.

The rack comprises a pivoting member, and a fixed support. The pivoting member, 6, is characterized by a semicircular, annular member, 34, having pivot elements, 24, 26, extending outwardly from diametrically opposite ends of this annular portion. Extending radially outward from the semicircular annular member is a web portion, which is symmetrically placed, with respect to the annular member, and occupies approximately 120° of the semicircular annular portion. The web portion is adapted to support a plurality of primary containers so that a combination of primary containers and an enclosure will be maintained in a radial orientation.

Figure 3:
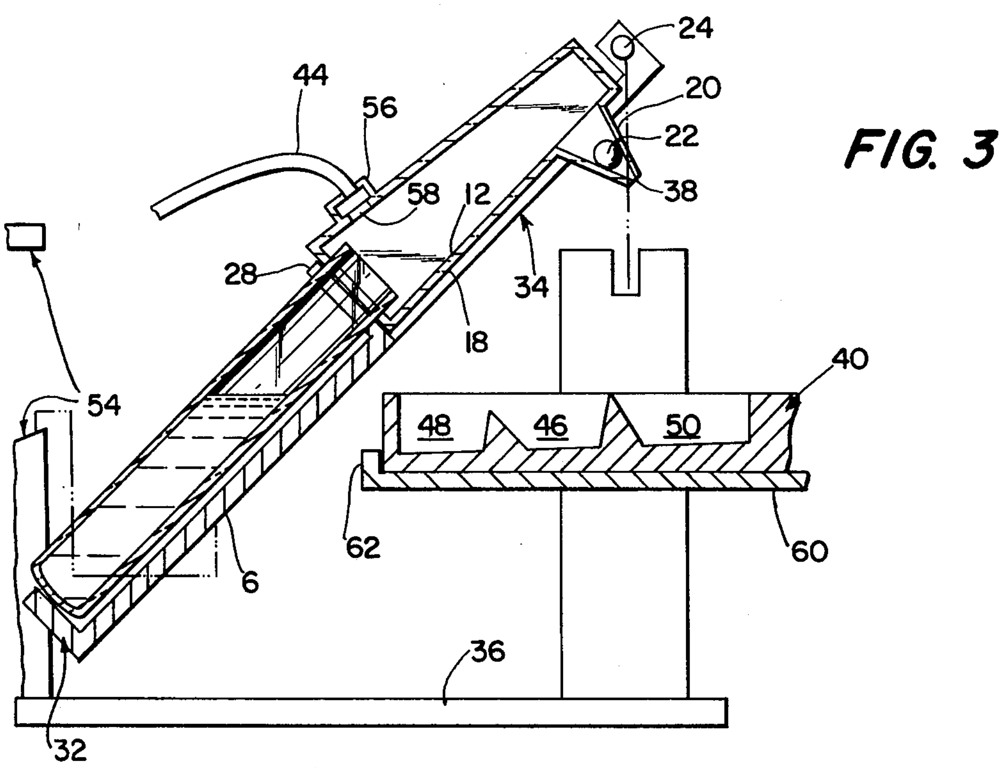
FIG. 3 is a sectional elevation view of the enclosure and pivoting rack assembly in explosion view, with respect to the support for the pivoting member.

The enclosure, 2, requires a first surface, 10, which may be segmented as shown in FIG. 1, or defined with a smooth circular arc, that occupies somewhat more than 120° of the arcuate extent of the enclosure. Septum-like walls, 14, are radially placed therein in order to separate and define the compartments which accept the fluid which flows by gravity from respective primary containers. The enclosure also requires a second surface, 18, which may be defined by the underside of the arcuately extending wall member, 12, as shown in FIGS. 1 and 3. The wall member, 12, may include an opening proximate its radially innermost end, for flow communication between a compartment and a conical extension, 20. Each conical extension extends outwardly from second surface, 18, and includes a valving mechanism defined by a bouyant ball, 22, of a specific gravity allowing the ball to float in a fluid which fills the conical extension, and an orifice at the distal end, whereby the funnel-like conical extension can be occluded by the ball.

As shown in FIG. 1, the pivoting rack member, 6, may include a series of registration members to maintain the enclosure, and its radially extending primary containers, in exact registration wth respect to the rack support. The pivoting rack member is preferably supported simply by two vertically extending members, 8, which are adapted to receive the diametrically opposed pins, 24, 26. The vertical suppors may be fixed upon a base, 36, which also has means to ensure that the entire assembly can easily be put into registration with a centrifugal analyzer head. The pivoting rack member may be provided with support ledge, 28, that includes cutouts, 30, to align the primary racks and enclosure module with respect to the fixed supports. The rack may also include a radially outermost ledge, 32, to ensure that each primary container is held against dislodgement after insertion through the first surface of the enclosure.

Figure 2:
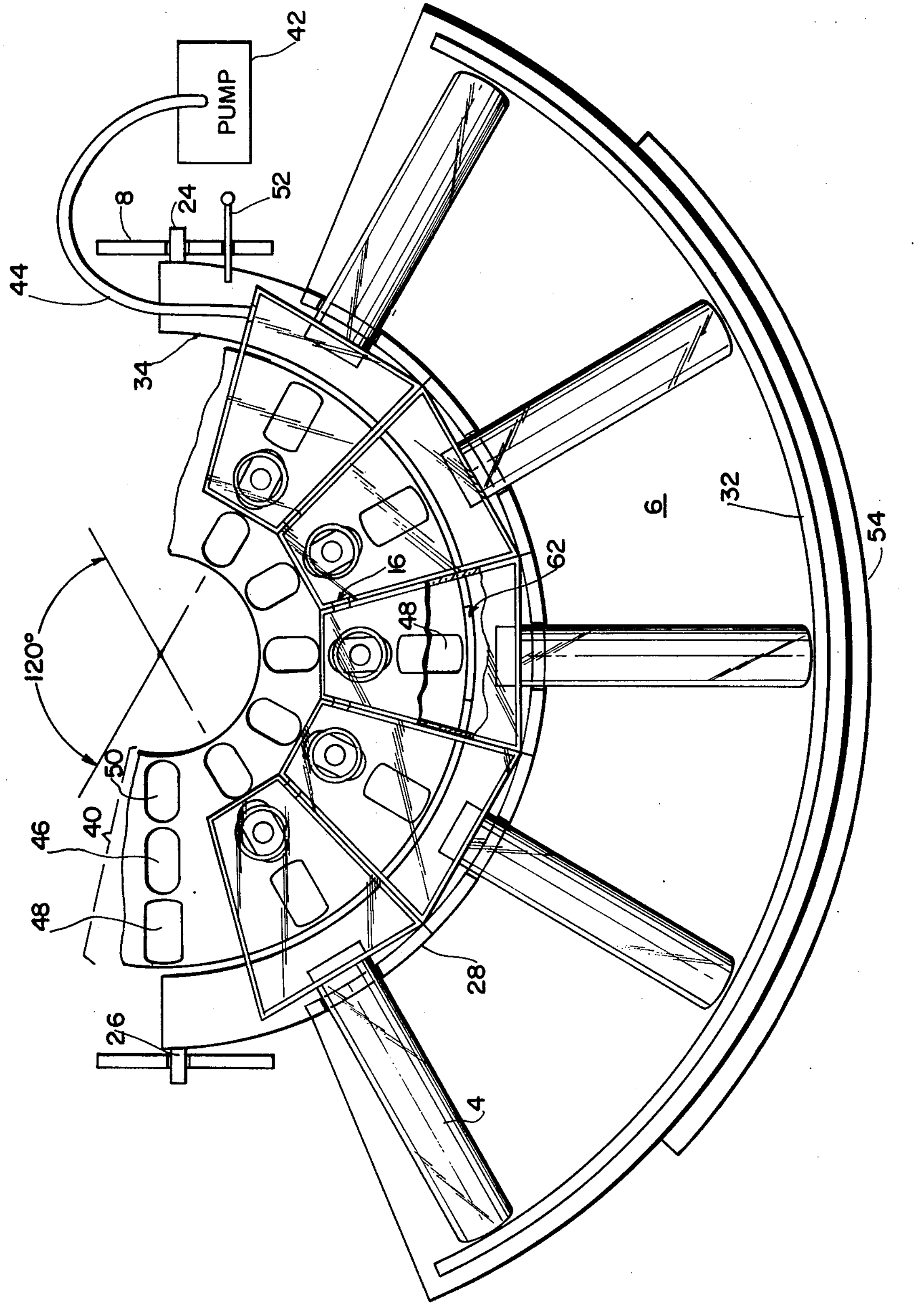
FIG. 2 is a plan view of the enclosure supported in a horizontal registration position by the rack, together with the gas pressure supply means illustrated schematically.

FIG. 2 illustrates, in plan view, the pivoting rack member in a substantially horizontal position, and in registration over a centrifugal analyzer head, 40. The centrifugal analyzer head, as has been noted, is a conventional laboratory device and it conventionally includes a series of radially aligned wells, or mixing chambers. The radially innermost well, 50, is conventionally filled with a reagent material, and the intermediate series of wells are conventionally filled with a biological fluid, such as blood serum. Upon centrifugation, the reagent in well 50 proceeds either into the serum well, 46, or both reagent and serum are separately accelerated into a mixing well, 48. The centrifugal analyzer head illustrated in FIG. 2 is a fifteen place type, with five series of radially aligned wells occupying one-third, i.e., 120°, of the circular distribution. Manifestly, versions of the present invention are equally adaptable to 36-place, and other, types of analyzer heads. In all such versions it is preferred that no more than approximately one-third of the number of circumferentially spaced wells be accommodated for one fluid transfer step, since the primary containers may then be easily loaded into the enclosure, without danger of spillage.

FIG. 2 also illustrates, schematically, a pump, 42, which may be of the syringe-type, as illustrated in the parent application, or of an electronic design which is capable of dispensing exact quantities of pressurized gas, such as air. Such pumps are conventional in the state of the art, and the pump may, for example, be of the positive displacement type wherein a piston within a cylinder compresses a given volume of air, to a given pressure. An outlet valve is then able to allow a precise volume of the air to be discharged, into line 44, upon demand. These controlled volumes of gas are supplied to each of the compartments, as by the interconnecting gas passages, 16, illustrated in FIG. 1. Because an equal pressure will be communicated to each compartment, the fluid in each is equally added upon, and a calibrated amount of fluid will pass the orifice at the distal end of each conical extension. As has been noted, the bouyant ball, 22, is of a specific gravity defined to be bouyant for a range of fluids expected to be used with the particular model of the enclosure, so that if a fluid within any compartment is depleted, the ball, 22, will occlude the outlet of the conical extension against loss of the gas pressure. As has been noted, the present invention is configured to only be operable when the rack is in the horizontal position as illustrated in FIG. 2, whereupon fluid will be allowed to flow gravitationally from each of the primary containers, and into a compartment. In order to maintain the rack in a substantially horizontal position the vertical support, 8, may be provided with a conventional latching mechanism, as shown schematically at 52. Further, since the centrifugal analyzer head must be maintained in registration with respect to the combination of the rack and enclosure, the fixed portion of the rack includes an alignment meams, such as the curvate stop, 62, illustrated in FIGS. 2 and 3. The fixed portion of the rack may also include a stop member, 54, which is adapted to prevent the rack from being swung in an arc which will substantially go above its approximately horizontal dispensing position.

FIG. 3 is a sectional elevation view with the pivoting rack member shown in an explosion position, with respect to the support of the pivoting member. FIG. 3 is a vertical section view, taken symmetrically along a pivoting rack member having an enclosure adapted for five compartments. FIG. 3 illustrates that the pivoting rack member, 6, may be removable from its support, 8, for loading into a rest position which may be approximately 45° below its dispensing, or substantially horizontal position. FIG. 3 illustrates one form of means for delivering a selectively controlled volume of pressurized gas in parallel to each of the compartments. A flexible conduit, 44, is connected to a pump of the aforedescribed type, and communicates the gas pressure to an external header, 56, which has orifices, 58, to allow gas communication into each compartment. In the illustrated preferred embodiment, the pivoting rack member may be separately loaded with its radially disposed primary containers and thereafter the enclosure, 2, inserted over the open and radially inner ends of each of the primary tubes. As shown in FIG. 2, the primary tubes are maintained in registration with respect to the pivoting member, 6, by the outer support, 32, and the inner support, 28. The primary containers may be simple test tubes which are normally used in laboratory work, having a volume ranging from approximately 3 cubic centimeters, to 12 cubic centimeters. For example, a standard test tube of the 12 cubic centimeter size has an outer diameter of approximately 10 mm. and a 3 cubic centimeter test tube has an outer diameter of approximately 4 mm. It should be apparent from FIG. 3 that the combined volume of the primary container and its associated compartment will ensure that no fluid will contact the orifice, 58, which is located, for example, on a trapezoidal surface defining the upper half of the compartment, when in a substantially horizontal position. The distal end, 38, of the conical extension, 20, is sized to not allow any fluid to flow by gravity therepast, taking into account the viscosity of the fluid which the particular enclosure is designed to dispense. The orifices at the distal end of each conical extension may be on the order of 0.01 to 5.00 mm. in diameter, depending upon the particular viscosity of the biological fluid. The present invention is particularly adapted to dispense fluids into various wells of a centrifugal analyzer head since the overall volume and outlet orifice sizes may easily be configured to suit the particular volumetric capacities of the particular centrifugal analyzer head being employed. For example, centrifugal analyzer heads conventionally work with aliquots of fluid in the range of between 5 microliters and 500 microliters. The particular application will dictate the sizing for the conical distal end, 38, and the compartment volumes.

It should also be apparent in FIG. 3 that the pivoting rack member, 6, may itself be used to centrifuge a plurality of primary containers which are filled with whole blood, and thereby separate the blood into its serum and solid components. Since the pivoting member is preferably an easily removable part of the overall combination, a number of racks may be prepared for easy insertion onto a vertical support device which allows for a sure alignment or registration to the analyzer head.

The centrifugal analyzer head, 40, may be simply supported with respect to the fixed base, 36, as by the support member, 60, which includes a stop, 62, to engage the outer circumference of the centrifugal analyzer head. In this manner the distal ends of each of the conical extensions, 20, will be precisely positioned, as for example, over a serum well, 46, in the centrifugal analyzer head version shown in FIG. 3.

Figure 4:
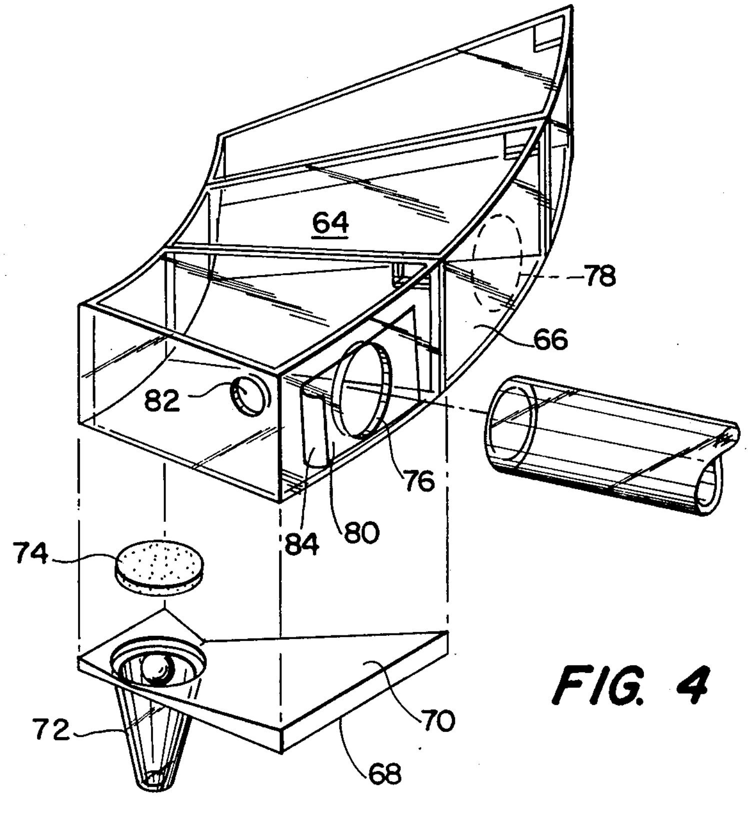
FIG. 4 is a partial disassembly explosion illustrating suggested elements for assembly of the enclosure.

FIG. 4 illustrates a manner of constructing an enclosure according to the present invention. The enclosure of FIG. 4 is arcuately extending with a first surface, 80, that is defined by a smooth curve. The first surface includes a plurality of radially aligned inlets, 76, 78. As illustrated in FIG. 4, the inlet, 76, in one portion of the first surface, 80, is precut to fit tightly against the outer diameter of a primary container, and the enclosure may be sealed prior to use by a simple removable tape, as illustrated at 84. The inlet may also be a scored frangible section, as illustrated at 78, which can be penetrated by the primary container itself. The enclosure may be manufactured in a manner as illustrated at FIG. 4, with filter elements, 74, placed to maintain the bouyant ball within each conical extension, 72, defined extending from a bottom wall member, 70. As shown in FIG. 4, the second wall member, 70, may be curved to enhance flow down towards the radially inward end of this trapezoidal shape wall member. Hence, whenever the second surface, 68, is substantially horizontal all the fluid will tend to collect in the vicinity above the filter, 74. FIG. 4 illustrates the first surface, 80, to be substantially orthogonal, or at a right angle, to the second surface. Any equivalent relative orientation would be consistent with the principles of the present invention.

Figure 5:
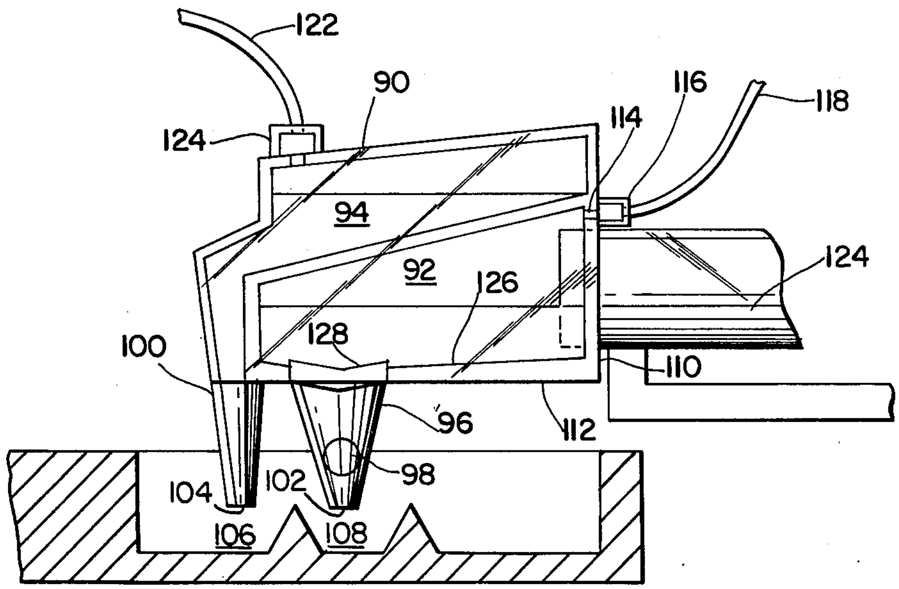
FIG. 5 illustrates a second, alternate embodiment for the enclosure, together with an alternate filter construction.

FIG. 5 illustrates a second preferred embodiment for the enclosure, together with an alternate filter construction. FIG. 5 is a vertical sectional view, and illustrates that the present invention may be used for simultaneously dispensing both a primary fluid, 124, and a reagent, 94. In the dual dispensing mode embodiment of FIG. 5 the primary fluid, 124, is urged out of the compartment, 92, by elective application of air pressure which is supplied, as hereinbefore, through a flexible line, 118, into a header which may be as shown at 116. The gas volume supplied through line 118 is supplied in parallel through orifices, as shown in 114, into each of the radial compartments. When a rack of the type illustrated in FIG. 1 is placed into its horizontal position, as shown in FIG. 5, the primary fluid, 124, flows down the bottom wall member, 126, towards the radially innermost end of the trapezoidal compartment, 92.

A filter of the inverted conical type, 128, may be disposed and the filter may be of any conventional form, including the molecular sieve type. For example, the Amicon Company makes a conical, polymer coated paper which may be used as the filter media. Such molecular sieve filters may have a pore size on the order of 25,000 molecular weight, which is capable of excluding even viruses, such as the hepatitus virus. With a molecular sieve or ultra filter within the present invention, an operator can consequently exclude any desired foreign matter from the fluid which is pressurized out of the distal end of each conical extension. It is often the case that a protein-free filtrate is desired for centrifugal analyzation, and the present invention has the capability of dispensing even ultrafiltrates, to thereby greatly facilitate the speed with which certain clinical chemical analyses are made. As in the previous embodiment, the conical extension, 96, extends downwardly from the radially innermost portion of a second surface, 112. FIG. 5 illustrates an application where, for example, a reagent well, 106, is radically inward from a serum well, 108. In the embodiment of FIG. 5 the reagent, 94, is directed through a second and separate funnel, 100, which is sized with an orifice, 104, that is sufficiently small to prevent any flow without a pressurization. Dispensing of reagent may be accomplished by a separate gas pressurization through a line, 122 (in a manner analogous to the primary fluid dispensing) with a header, 124, and separately associated orifices for separate compartments. Alternatively, the reagent compartment, 90, may constitute a common chamber with separate outlets, 100, simply positioned to fill each respective reagent well, 106. In the embodiment of FIG. 5 the gas pressurization for line 122 will be separate from that attached to the primary pressurization line, 118, in order to selectively allow either no reagent to be employed, or varying amounts to be selectively applied into the reagent well, 106. In this manner the dispensing of reagent will be separate from that definitive dispensing of the primary fluid. While FIG. 5 illustrates a single reagent, 94, the present invention may include one or more reagent chambers, which may be selectively energized at various registrations to the centrifugal analyzer head. For example, profiling may be accomplished by a selective dispensing of a biological fluid into, for example, three different radially spaced wells, with different reagents being energized for each well. In this manner, a profiling on a single centrifugal analyzer head is easily possible.

Figure 6:
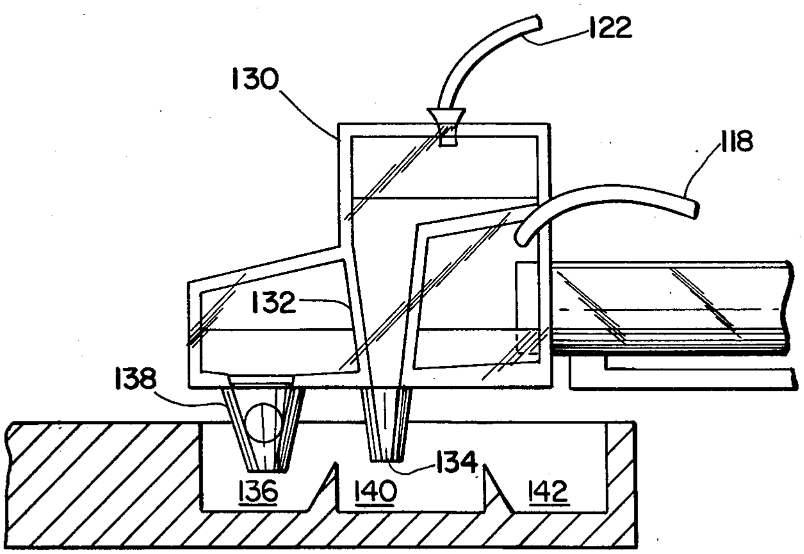
FIG. 6 illustrates a third embodiment for the enclosure.

A second embodiment of enclosure according to the present invention is illustrated in FIG. 6, which illustrates that a reagent may be also directed through a funnel, 132, which is radially inward of the primary fluid dispensing extension, 138. In FIG. 6, the serum well, 136, is radially inward of the reagent well, 140, and an outermost mixing well, 142, is additionally illustrated. Dispensing of the primary fluid is also accomplished through a primary pressurization line, 118, with the reagent being separately dispensed upon gas pressurization through the reagent pressurization line, 122. Reagent chamber, 130, may preferably also be common over a number of the primary fluid dispensing chambers, wherein aliquots of reagent will be dispensed at one time through a plurality of outlet orifices, 134.

While various embodiments of my invention have been illustrated, it is understood that the invention is to be defined solely by the scope of the appended claims.

I claim:

1. A disposable laboratory device for transferring fluids from at least one primary container to an associated well in a centrifugal analyzer head, comprising:

(A) an arcuately extending enclosure defining at least one radially disposed compartment therein, wherein said compartment is adapted to maintain fluid therein separate from any adjacent compartments, said enclosure having a first radially outermost surface adapted to receive an open end of a radially disposed primary container for flow communication into an associated compartment within said enclosure, and;

(B) a second surface on said enclosure, said second surface including an outlet means operable for a selective outlet flow communication from each compartment to an associated well in a centrifugal analyzer head when said second surface is positioned substantially horizontal and above a centrifugal analyzer head which is in a registration position, and;

(C) means for delivering a selectively controlled volume of pressurized gas to said at least one compartments, whereby said pressurized gas is operable to transfer a selective volume of fluid, which has flowed into any compartment from an associated primary container, from said any compartment into a well which is in registration with the outlet means of said compartment, wherein said outlet means further includes fluid valve means operable to close said outlet flow communication when all of the fluid within a given compartment has been so transferred to the well in registration therewith.

2. A disposable laboratory device according to claim 1, wherein said enclosure extends in an arc of approximately 120° and the outlet means for said at least one compartments extends proximate the radially innermost portion of said second surface.

3. A disposable laboratory device as in claim 2 wherein said means for delivering a selectively controlled volume of pressurized gas further comprises a header in parallel gas communication between a source of pressurized gas and a plurality of said compartments.

4. A disposable laboratory device as in claim 3 wherein said header is defined by a plurality of gas passages located in septum-like wall structures which are radially aligned, and define a separation between adjacent compartments, wherein said plurality of gas passages is located proximate a surface of said enclosure which is opposite said second surface.

5. A disposable laboratory device as in claim 3 wherein said first surface is further defined by individual substantially rectangular surfaces which are each respectively normal and symmetrical to the radial center line of each radially aligned compartment, wherein further said second surface is planar and comprised of a series of adjacent trapezoids wherein the sides of said adjacent trapezoid define the position of septum-like walls which separate each of the plurality of compartments along the arcuate extent of said enclosure.

6. A disposable laboratory device according claim 5 wherein said outlet means further comprises a conical extension extending outwardly from said second surface proximate each narrow inward end of each of said trapezoidal shapes, thereby defining a plurality of funnel-like structures which are each in flow communication with a compartment, each of said conical extensions having a proximate end, at said second surface, and a fluid orifice, at a distal end, wherein said fluid valve means further comprises a ball which is bouyant in said fluid and adapted to occlude said conical extensions in the absence of such fluid, said ball being constrained for a bouyant movement within said conical extensions.

7. A disposable laboratory device according to claim 6 wherein said fluid orifice of the distal end of said funnel is dimensioned so that a meniscus of fluid will form at said fluid orifice in the absence of a selective pressurization upon fluid within said compartment by said gas pressurization means.

8. A disposable laboratory device according to claim 1 wherein said outlet means further includes a filter member between the outlet means and said compartment, whereby fluid dispensed from said each compartment into said outlet means is necessarily filtered.

9. A disposable laboratory device according to claim 8 wherein said filter is of the molecular sieve type.

10. A disposable laboratory device according to claim 6 wherein said orifice at the distal end of said funnel is between 0.1 and 5.00 mm. in diameter, and the volume defined by each trapezoidal compartment is between approximately 2 cubic centimeters and 12 cubic centimeters.

11. A disposable laboratory device according to claim 1 in combination with a rack, said rack comprising:

(i) a pivoting rack member defined by a semicircular, annular portion having pivot elements extending radially outwardly over approximately 120° of said semicircular portion, wherein said web portion is adapted to support a plurality of said primary containers, in said radial orientation; and, (ii) a support adapted to pivotably support said pivot elements, and allow pivoting of said member into said substantially horizontal orientation position; wherein (iii) said support includes means to locate a centrifugal analyzer head in said registration position.

12. A combination according to claim 11 wherein said enclosure comprises a plurality of compartments and said enclosure is mounted upon the radially inward end of a plurality of primary containers supported by said pivoting rack member.

13. A combination according to claim 12 wherein said support includes a pair of vertically extending members adapted to allow said pivoting rack member to be removed for loading of said primary containers and said enclosure.

14. A combination according to claim 12 wherein said means to locate a centrifugal analyzer head includes a stop adapted to allow a centrifugal analyzer head to be moved horizontally into a registration position between a pair of vertically disposed support arms.

15. A disposable laboratory device according to claim 1 or 11 wherein said arcuately extending enclosure additionally defines at least one reagent compartment superposed upon said enclosure, said reagent compartment including means to separately dispense reagent into at least one well of said centrifugal analyzer head, when said second surface is positioned substantially horizontal above said centrifugal analyzer head.

16. A disposable laboratory device according to claim 15 wherein said reagent compartment is a common chamber located above a plurality of compartments within said enclosure, and said reagent chamber includes a plurality of funnel-like members disposed in radial alignment with each said conical extensions to allow a separate pressurization of said reagent chamber to dispense desired aliquots of reagent into reagent wells in said analyzer head which is in said registration position.

* * * * *